Sept. 29, 1964   L. P. EVANS ETAL   3,150,814
SYSTEM AND METHOD FOR CONTROLLING TURBINE SPEED
Filed July 23, 1962
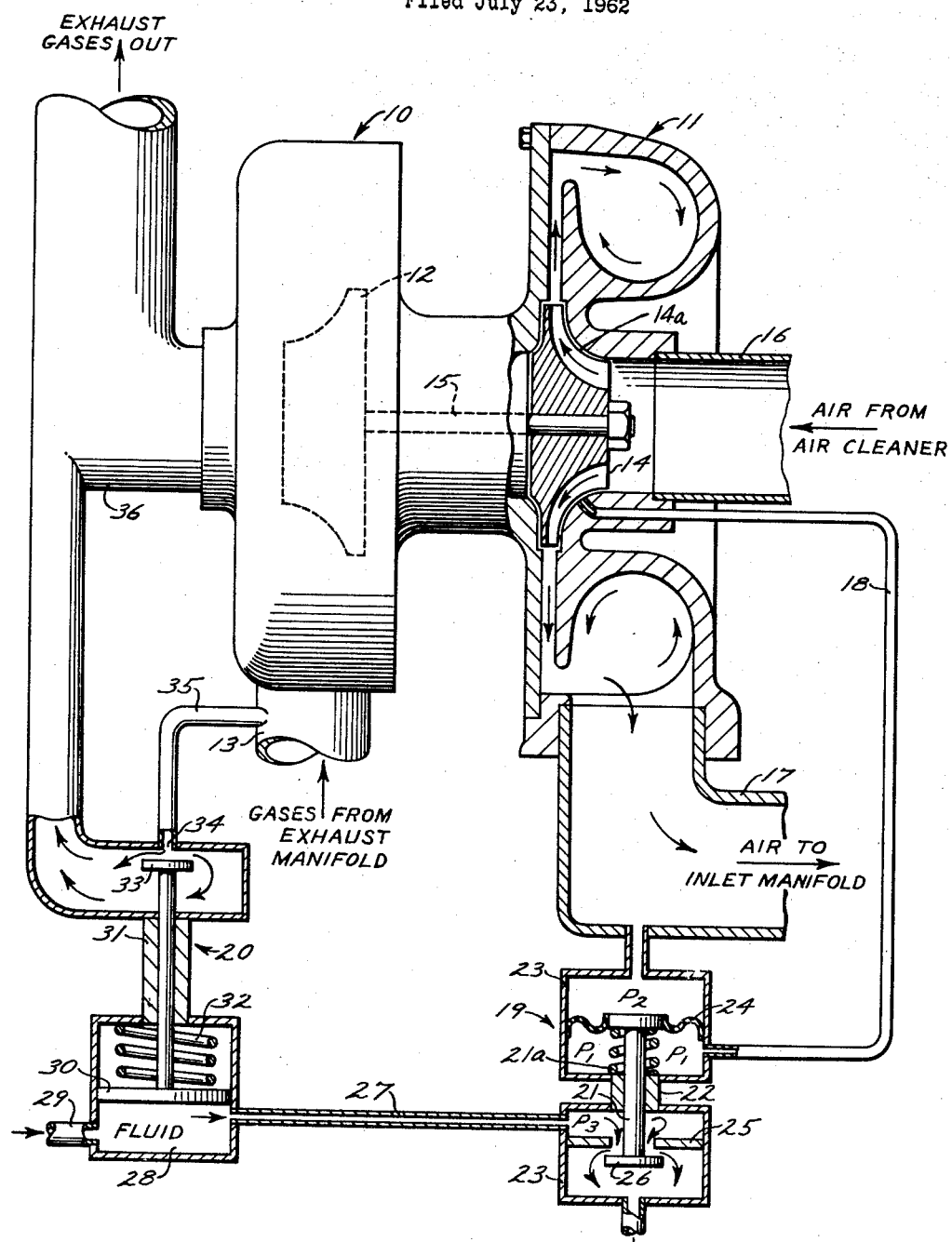
INVENTORS
LAWTON P. EVANS
KENNETH D. PROBERT
BY
Fryer and Zinnwald
ATTORNEYS

United States Patent Office 3,150,814
Patented Sept. 29, 1964

3,150,814
SYSTEM AND METHOD FOR CONTROLLING TURBINE SPEED
Lawton P. Evans, Seattle, Wash., and Kenneth D. Probert, Peoria, Ill., assignors to Caterpillar Tractor Co., Peoria, Ill., a corporation of California
Filed July 23, 1962, Ser. No. 211,558
5 Claims. (Cl. 230—9)

This invention relates to a system and method for controlling turbine speed and more particularly relates to a system and method for controlling turbocharger speed during critical phases of engine operation, pursuant to a pressure ratio obtained from the compressor thereof.

During critical phases of engine operation it ofttimes becomes desirable to regulate the amount of exhaust gases discharged into the turbine thereof in order to control its speed and thus the amount of air discharged into the engine by the compressor. For example, during a high load-low speed condition of engine operation it is desirable to maintain high turbocharger speed and therefore high air pressure in the engine, but it is also necessary to prevent over-speeding and possible self-destruction of the turbocharger during high speed-high load engine operation. Many prior attempts have generally necessitated relatively complex structures which are inherently prone to mechanical failure and do not function to efficiently control turbine speed.

The present invention has overcome many of the above mentioned difficulties by providing a system and method for obtaining a pressure ratio existing between the outlet and rotor passages of a compressor in order to precisely control the amount of exhaust gases discharged into a turbine. Thus, during critical phases of engine operation such a ratio may be utilized in its most important functions of controlling turbine speed and accordingly regulating the amount of air pumped into the engine through the compressor.

In accordance with the above discussions, an object of this invention is to provide a system and method for efficiently controlling turbine speed during critical phases of engine operation.

Another object of this invention is to provide a system for efficiently controlling turbine speed which is efficient in operation and durable in construction.

Further and more specific objects of this invention will be made apparent from the following description and accompanying drawing.

The drawing is a schematic elevational view, partly in cross-section, disclosing a system employing novel concepts of the invention in combination with a turbocharger.

As disclosed in the drawing, a turbocharger comprising a turbine 10 and compressor 11 is arranged in the conventional manner to have a turbine rotor 12 driven by exhaust gases received from an engine exhaust manifold 13. The turbine rotor in turn functions to drive an impeller 14 of the compressor by means of an interconnecting drive shaft 15. The compressor is arranged to receive air at the upstream side thereof from an inlet conduit 16 which connects to a standard air cleaner (not shown) of the engine. The air is thereafter pumped by the impeller into an engine inlet manifold 17 located at the downstream side thereof. The term "upstream of the compressor" should be herein understood to include the conduit 16.

Novel concepts of this invention comprise a sensing of static pressure in a restricted passage portion which is located upstream of the outlet of the compressor. The air velocities are relatively high in such a restricted passage portion, as compared with interconnecting flow passages having greater cross-sectional areas, and consequently, the static pressure therein varies with air mass flow in a manner whereby turbine speed control may be efficiently achieved.

The drawing illustrates such a restricted passage portion as comprising the flow space 14a defined by impeller 14 and the casing of compressor 11, which space exhibits static pressure characteristics similar to those of a Venturi passage which might be formed in conduit 16, for example. In many applications it is preferred to use the flow space 14a as a source of static pressure for this purpose, due to less pressure loss thereat and decreased cost. A conduit 18 is constructed and arranged to sense the static pressures occurring adjacent flow space 14a and relays such pressures to a control valve assembly 19.

When the fluid is passing through the impeller passages at a relatively high mass flow, the sensed static pressure is relatively low in accordance with well known principles and vice versa when the fluid moves at a relatively low mass flow. A valve actuating pressure ratio may thus be obtained along with those pressures sensed in the valve assembly from manifold 17. This pressure ratio is utilized to control a waste gate valve assembly 20, which is operatively associated with manifold 13 to tap and dump exhaust gases therefrom when necessary to reduce turbine speed.

The valve assembly 19 comprises a reciprocating piston 21 which is urged in an upward direction by spring 21a and is slidably mounted in a bushing 22 arranged to divide chamber assembly 23. A flexible diaphragm member 24 is attached to the inner walls of the upper chamber and to the piston. Thus, the piston is adapted to be urged downwardly by the pressures $P_2$ and fluid pressure $P_3$, and upwardly by pressures $P_1$ and spring 21a. The system may be designed, for example, so that when the pressure ratio $P_2$:$P_1$ exceeds 2:1, that the piston will be driven in a downwardly direction. The lower chamber is divided into two portions by means of an apertured baffle plate 25. The fluid discharge area through the baffle plate is regulated by a disc 26 which is formed on the piston.

A conduit 27 communicates with a chamber 28 which is arranged to receive a suitable fluid therein by means of a conduit 29. The conduit 29 may in turn be arranged to receive engine fuel, lubricating oil or other suitably pressurized actuating fluid. A reciprocating piston 30 is guided in its movements by a bushing 31 and is urged downwardly by means of a compressed coil spring 32. A disc 33 is formed on the upper end of piston 30 and is arranged thereon to regulate the outlet 34 of a bypass conduit 35. Conduit 35 forms a bypass between manifold 13 and an exhaust stack 36.

Airflow through conduit 16 and the illustrated impeller flow space 14a normally decreases when the engine is lugged down during high speed-high load operation. In response thereto, pressure $P_1$ increases thus permitting a substantially constant turbocharger speed during the range of wastegate operation. During this high speed-high load engine operating condition, it is generally desirable to limit turbocharger speed to prevent a self-destruction thereof. Thus, should the pressure ratio $P_2$:$P_1$ exceed a predetermined value, piston 21 will be moved downwardly to increase the area of fluid drainage through the apertured baffle plate 25. This drainage in turn proportionally relieves the fluid pressure in chamber 28 to permit spring 32 to urge piston 30 downwardly. Such action will dependently result in an area increase at the outlet of bypass conduit 35 to permit the tapping-off of a proportional amount of exhaust gas from conduit 13. Thus, both turbine speed and compressor air discharge are regulated.

We claim:
1. A system in combination with a turbocharger for controlling the speed thereof, said turbocharger having a turbine and a compressor, said compressor comprising a casing arranged to surround a bladed rotor to provide a flow space therebetween, said system comprising first means for directly obtaining a pressure ratio between the static pressure prevalent in the flow space in said compressor and at an outlet thereof and second means responsive to said pressure ratio to regulate the amount of actuating gases discharged into said turbine by bypassing predetermined amounts of said actuating gases thereby in response to said pressure ratio.

2. A speed control system in combination with a turbocharger comprising a turbine and compressor, a turbine rotor arranged to drive a compressor rotor, said compressor rotor rotatably mounted in and surrounded by a casing, said compressor rotor comprising blades arranged to provide a flow space between said blades and said casing, said speed control system comprising first means for obtaining a pressure ratio of the static pressure prevalent in the flow space between said blades and said casing to the static pressure prevalent at an outlet of said compressor and second means responsive to said pressure ratio for regulating the amount of actuating gases discharged into said turbine to thereby control the speed of said turbine rotor and thus the amount of air discharged by said compressor.

3. A control system in combination with a turbocharger having an operatively connected compressor and a turbine, said compressor having an inlet, an outlet and an impeller having blades arranged to pump a first fluid, a casing arranged in surrounding relationship with the impeller of said compressor and providing a first fluid flow space therebetween, said turbine having an inlet arranged to receive actuating gases and an outlet for discharging such gases, a passageway communicating with said turbine inlet and outlet, said control system comprising a first valve means for normally opening said passageway and having a first chamber arranged to receive a second fluid for closing said passageway when the pressure of said second fluid reaches a predetermined amount, a second valve means having a second chamber communicating with said first chamber for selectively permitting said second fluid to flow therethrough, first means communicating with the outlet of said compressor and said second valve means to transmit first fluid pressure therebetween for urging said second valve means to an open position and second means communicating with the first fluid flow space provided between the impeller of said compressor and said casing and said second valve means to transmit first fluid pressure therebetween for urging said second valve means to a closed position, whereby said second valve means may be automatically opened or closed pursuant to the pressure ratio existing between the pressures occasioned in said first and second means.

4. A system in combination with a turbocharger for controlling the speed thereof, said turbocharger having a turbine arranged to receive actuating gases and a compressor arranged to have a gas flow from an inlet to an outlet thereof for engine consumption purposes, said compressor comprising a casing arranged to surround a bladed rotor to provide a flow space therebetween, said system comprising first means for obtaining a pressure ratio between the pressure prevalent in the flow space provided between said casing and said bladed rotor and the pressure occurring downstream of the outlet of said compressor and second means responsive to said pressure ratio for regulating the amount of actuating gases discharged into said turbine by bypassing predetermined amounts of said actuating gases thereby in response to said pressure ratio.

5. A method for controlling the speed of a turbocharger having a compressor arranged to be driven by a turbine comprising the steps of sensing a first static fluid pressure prevalent in a flow space located between blades of a rotor of said compressor and a casing arranged to surround said rotor, sensing a second static fluid pressure at an outlet of said compressor, maintaining a pressure ratio with said sensed first and second static pressure and regulating the amount of gases discharged into said turbine in response to said pressure ratio to thereby control the amount of fluid discharged by said compressor.

References Cited in the file of this patent
UNITED STATES PATENTS

| | | |
|---|---|---|
| 1,203,315 | De Wein | Oct. 31, 1916 |
| 1,241,372 | Guyer | Sept. 25, 1917 |
| 1,408,710 | Nusim | Mar. 7, 1922 |
| 1,616,450 | Huff | Feb. 8, 1927 |
| 1,874,136 | Standerwich | Aug. 30, 1932 |
| 2,376,199 | Shoults | May 15, 1945 |
| 2,393,172 | Larrecq | Jan. 15, 1946 |
| 2,470,565 | Loss | May 17, 1949 |
| 3,035,408 | Silver | May 22, 1962 |